F. V. PHILLIPS.
AUTOMOBILE WHEEL HELP.
APPLICATION FILED JUNE 11, 1913.
1,075,377.
Patented Oct. 14, 1913.
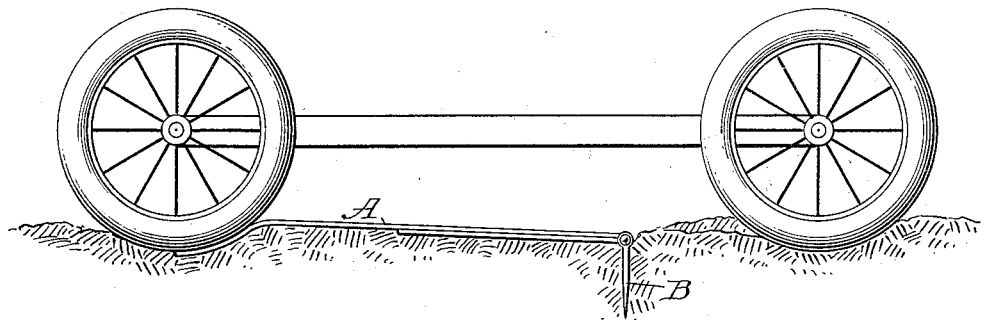
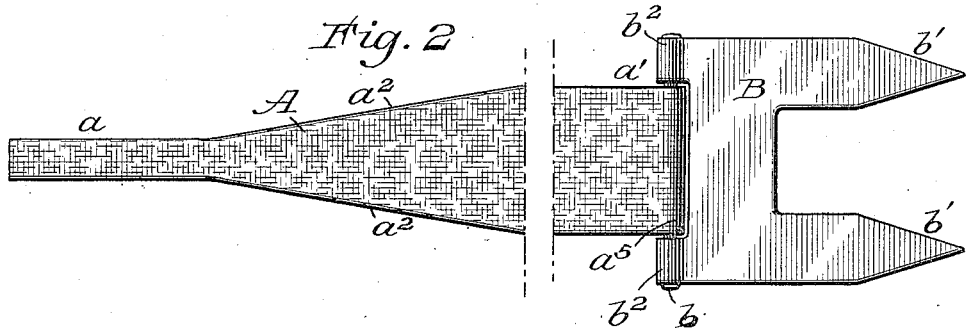
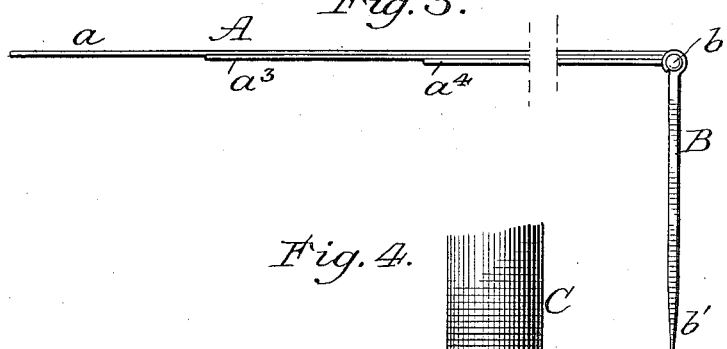
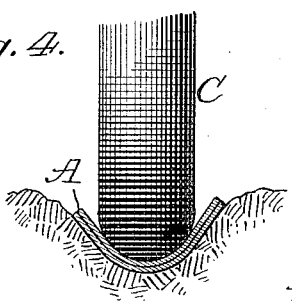
Attest:
Paul Finckel
Annie Cooper
Inventor:
Francis V. Phillips,
By Lowell Battle
Attorney.

UNITED STATES PATENT OFFICE.

FRANCIS V. PHILLIPS, OF ORLANDO, FLORIDA.

AUTOMOBILE WHEEL HELP.

1,075,377.

Specification of Letters Patent.

Patented Oct. 14, 1913.

Application filed June 11, 1913. Serial No. 773,021.

*To all whom it may concern:*

Be it known that I, FRANCIS V. PHILLIPS, a citizen of the United States, residing at Orlando, in the county of Orange and State of Florida, have invented new and useful Improvements in Automobile Wheel Help, of which the following is a specification.

This invention relates to a device for enabling a self-propelled vehicle to extricate itself from mud holes, or from a surface on which the driving wheels will race without advancing the vehicle.

The object of the invention is to provide an efficient device which may be conveniently carried and which may be manufactured at small cost.

In the drawings forming a part of this invention, I have illustrated my invention in its preferred form, and after a detail description thereof, the features deemed novel will be specified in the appended claims.

Referring to the drawings—Figure 1 illustrates my device as applied for service. Fig. 2 illustrates the same in plan view. Fig. 3 is an edge view thereof with the anchoring device turned at right angles with the flexible strip; and Fig. 4 is a sectional view through the wider portion of the flexible strip showing the position assumed when under an automobile wheel.

My improved device comprises a flexible strip A having an anchoring device B secured to one end thereof. The strip A is preferably composed of canvas or other suitable material having a roughened surface and is comparatively narrow at its forward or free end $a$, and is of considerable width at the opposite end $a'$ which is attached to the anchoring device B. The marginal edges $a^2$ gradually incline outwardly from the narrow to the wide end as clearly illustrated in Fig. 2, and the wide portion of the strip is preferably stiffened by extra plies of canvas $a^3$ and $a^4$ as shown in Fig. 3, the outer layers of the canvas or fabric forming a loop $a^5$ at the wide end of the strip through which passes a rod or pintle $b$ of the anchoring device B; this securing means forming a hinge joint as clearly shown.

The anchoring device B is preferably formed from thin sheet metal and is provided with two prongs $b'$, $b'$ to enable it to be readily driven into the ground as shown in Fig. 1. Its upper or forward end is provided with knuckles $b^2$, $b^2$, one on each side of the fabric strip A which receive the ends of the pintle $b$, the latter being headed or riveted for holding it in place as will be readily understood.

In the use of the device, the anchoring device B is driven into the ground in advance of the driving wheel or wheels, (two of the devices being used when necessary, one for each of the driving wheels) at a distance therefrom less than the length of the flexible strip. Rotation of the driving wheels will operate to draw the narrow end of the fabric down into the rut, the width of the fabric being such as to permit it to enter a narrow rut and curve itself, to fit the rut and tire. As heretofore explained the wheel operates to draw the belt thereunder, and when it reaches the thicker and stiffer part of the strip a wedge is formed in the rut, thus preventing the belt from further slipping and giving the wheels the necessary purchase to pull out, as illustrated in Fig. 4, the reference letter C in said figure indicating the driving wheel of the vehicle.

It will be readily understood that my device may be folded so that it will occupy a comparatively small space in the vehicle when not in use.

Having thus described my invention, what I claim as new and desire to secure by Letters Patent, is:

1. A device of the character described comprising a strip of flexible material having a relatively narrow end adapted to enter a rut under a wheel, and having marginal edges inclined outwardly toward the wider opposite end, the wider portion of the strip being adapted to be flexed laterally by the wheel to cause the strip to enter the rut.

2. A device of the character described comprising a strip of flexible material having a relatively narrow end adapted to enter a rut under a wheel and having its marginal edges inclined outwardly toward the wider or opposite end, the wider portion of the fabric being reinforced or stiffened and being adapted to be flexed laterally by the wheel to cause the strip to enter the rut.

3. A device of the character described comprising a strip of flexible material and anchoring means secured to one end thereof and adapted to be driven in the ground.

4. A device of the character described comprising a strip of flexible material and anchoring means secured to one end thereof, said strip having a relatively narrow opposite end.

5. A device of the character described comprising a strip of flexible material having a relatively narrow end and marginal edges gradually inclined outwardly toward the opposite end, and an anchoring device secured to the wider end adapted to be driven into the ground.

6. A device of the character described comprising a strip of flexible material having a relatively narrow end and marginal edges gradually inclined outwardly toward the opposite end, an anchoring device secured to the wider end of the strip, said anchoring device consisting of a flat sheet metal plate provided with prongs and adapted to be driven into the ground and provided with securing means for the strip.

In testimony whereof I have hereunto set my hand in presence of two subscribing witnesses.

FRANCIS V. PHILLIPS.

Witnesses:
W. R. O'NEAL,
J. S. POMEROY.

---

Copies of this patent may be obtained for five cents each, by addressing the "Commissioner of Patents, Washington, D. C."